(12) United States Patent
 Nishikawa

(10) Patent No.: US 10,949,142 B2
(45) Date of Patent: Mar. 16, 2021

(54) INFORMATION PROCESSING APPARATUS, METHOD, AND COMPUTER PROGRAM PRODUCT FOR MANAGING NETWORK DEVICE AND HANDLING INCONSISTANT SETTING INFORMATION

(71) Applicant: CANON KABUSHIKI KAISHA, Tokyo (JP)

(72) Inventor: Satoshi Nishikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/931,072

(22) Filed: May 13, 2020

(65) Prior Publication Data
US 2020/0364008 A1 Nov. 19, 2020

(30) Foreign Application Priority Data
May 17, 2019 (JP) .............................. JP2019-093738

(51) Int. Cl.
*G06F 3/12* (2006.01)
*H04N 1/00* (2006.01)

(52) U.S. Cl.
CPC .......... *G06F 3/1231* (2013.01); *G06F 3/1203* (2013.01); *G06F 3/1238* (2013.01); *G06F 3/1253* (2013.01); *G06F 3/1285* (2013.01); *H04N 1/00344* (2013.01); *H04N 2201/0094* (2013.01)

(58) Field of Classification Search
CPC .... G06F 3/1203; G06F 3/1204; G06F 3/1224; G06F 3/1231; G06F 3/1238; G06F 3/1253; G06F 3/1285; G06F 3/1286; G06F 3/1287; H04N 1/00127; H04N 1/00204; H04N 1/00209; H04N 1/00244; H04N 1/00344
See application file for complete search history.

(56) References Cited

U.S. PATENT DOCUMENTS

2008/0231887 A1* 9/2008 Sakagami ............. G06F 3/1238
 358/1.15
2010/0002250 A1* 1/2010 Sakagami .......... G03G 15/5016
 358/1.14

(Continued)

FOREIGN PATENT DOCUMENTS

JP 2013-243488 A 12/2013

*Primary Examiner* — Scott A Rogers
(74) *Attorney, Agent, or Firm* — Canon U.S.A., Inc. I.P. Division

(57) ABSTRACT

An information processing apparatus manages setting information as first setting information. The setting information is necessary to acquire user information from a device through a network. The user information includes at least either one of an upper limit number of storage areas that are allocated in the device and available to a user, or a level of authority to control data to which the user can refer on the device. Setting information which is necessary to acquire the user information from the device is acquired as second setting information. When there is inconsistency between the first and second setting information due to a content mismatch, the user information is acquired from the device through the network by using either one of the first setting information or the second setting information in both the information processing apparatus and the device. The user information acquired from the device is imported.

10 Claims, 15 Drawing Sheets

(56) References Cited

U.S. PATENT DOCUMENTS

2011/0051193 A1\* 3/2011 Okabe ................ H04N 1/00204
358/1.16
2014/0063534 A1\* 3/2014 Kawai ................... G06F 3/1288
358/1.14

\* cited by examiner

FIG.5A

| | DEVICE NAME | HOST NAME | IP ADDRESS | SERIAL NUMBER |
|---|---|---|---|---|
| ☐ | Device1 | host21 | 192.168.10.87 | 18993354 |
| ☐ | Device2 | host31 | 192.168.10.100 | 18993344 |
| ☐ | Device3 | host44 | 192.168.10.110 | 18993343 |

DEVICE LIST

SELECT ALL   CANCEL ALL

NEXT

FIG.5B

SETTING INFORMATION

| REGISTERED NAME | Device2 | DETAILS |
| SNMP SETTING | PORT NUMBER: 161 | DETAILS |
| AUTHENTICATION SETTING | ID: 0001 | |
| | PASSWORD: xxxx | |
| UNIQUE API SETTING | ID: 0001 | |
| | PASSWORD: xxxx | |
| ADMINISTRATOR AUTHORITY | PASSWORD: xxxx | |

NEXT

FIG.6A

| | USER INFORMATION | | | ✕ |
|---|---|---|---|---|
| | USER REGISTRATION | IMPORT | | |
| | USER NAME | PASSWORD | DEPARTMENT | E-MAIL ADDRESS |
| ☐ | USER A | xxxxx | DEPARTMENT 1 | Usera...@... |
| ☐ | USER B | xxxxx | DEPARTMENT 1 | Userb...@... |
| ☐ | USER C | xxxxx | DEPARTMENT 2 | Userc...@... |

NEXT

FIG.6B

IMPORT SELECTION ✕

IMPORT
○ IMPORT FROM FILE
● IMPORT FROM DEVICE
○ IMPORT FROM EXTERNAL SERVER

BACK   NEXT

FIG.6C

DEVICE SELECTION ✕

SELECT ALL   CANCEL ALL

| | DEVICE NAME | HOST NAME | IP ADDRESS | SERIAL NUMBER |
|---|---|---|---|---|
| ☐ | Device1 | host21 | 192.168.10.87 | 18993354 |
| ☐ | Device2 | host31 | 192.168.10.100 | 18993344 |
| ☐ | Device3 | host44 | 192.168.10.110 | 18993343 |

BACK   EXECUTE

FIG.7A

SETTING INFORMATION  ✕

| REGISTERED NAME | Device2 | DETAILS |
| SNMP SETTING | PORT NUMBER: 161 | DETAILS |
| AUTHENTICATION SETTING | ID: 0001 | |
| | PASSWORD: 12345 | |
| UNIQUE API SETTING | ID: | |
| | PASSWORD: | |
| ADMINISTRATOR AUTHORITY | PASSWORD: 12345 | NEXT |

FIG.7B

SETTING INFORMATION  ✕

| REGISTERED NAME | Device2 | DETAILS |
| SNMP SETTING | PORT NUMBER: 161 | DETAILS |
| AUTHENTICATION SETTING | ID: 0001 | |
| | PASSWORD: 12345 | |
| UNIQUE API SETTING | ID: 1000 | |
| | PASSWORD: abcde | |
| ADMINISTRATOR AUTHORITY | PASSWORD: 12345 | NEXT |

FIG.7C

SETTING INFORMATION UPDATE  ✕

SETTING INFORMATION OF Device2
UNIQUE API SETTING HAS BEEN UPDATED.

IMPORT FROM DEVICE  ✕

USER INFORMATION CANNOT BE ACQUIRED DUE TO INADEQUATE MAIN BODY SETTING OF Device2.

| | DEVICE NAME | HOST NAME | IP ADDRESS | SERIAL NUMBER |
|---|---|---|---|---|
| ☐ | Device1 | host21 | 192.168.10.87 | 18993354 |
| ☐ | Device2 | host31 | 192.168.10.100 | 18993344 |
| ☐ | Device3 | host44 | 192.168.10.110 | 18993343 |

DEVICE SELECTION

SELECT ALL   CANCEL ALL

BACK   EXECUTE

INFORMATION PROCESSING APPARATUS, METHOD, AND COMPUTER PROGRAM PRODUCT FOR MANAGING NETWORK DEVICE AND HANDLING INCONSISTANT SETTING INFORMATION

BACKGROUND

Field

The present disclosure relates to a technique of managing a network device including an image processing apparatus through a network.

Description of the Related Art

A conventional management apparatus acquiring and managing data such as operation information of an image forming apparatus (hereinafter referred to as device) such as a printer and a multi-function apparatus has been known. The management device is realized by executing device management software in an information processing device. The recent years have seen increase in the number of devices that can be managed by one management apparatus from the viewpoint of increase of management target devices, cost reduction of a management server, and maintenance. Such a management apparatus can manage device information of the device, setting information of the device, and information about a user of the device (user information), and can also acquire the information from the device, as discussed in Japanese Patent Application Laid-Open No. 2013-243488. Intended use of the acquired information includes distributing the information to another device.

When the management apparatus described above acquires the user information from the device, different pieces of data included in the user information may have different settings of, for example, authority necessary for the acquisition and protocols. Individually, the settings can be activated/deactivated or can change parameters by both the management apparatus and the target device. With diversified ways of working in late years, there may arise a case in which a plurality of administrators manages one device.

SUMMARY

In a case where a plurality of administrators manages one device, when a management apparatus acquires user information from the device and imports the user information to itself, inconsistency may occur between contents of part of settings necessary for acquiring data of the target device managed by the administration apparatus and contents of a main body setting of the device. In such a case, the management apparatus cannot acquire part of the user information from the device.

According to an aspect of the present disclosure, an information processing apparatus includes at least one processor and at least one memory storing instructions that, when the instructions are executed by the at least one processor, cause the at least one processor to perform operations including managing setting information as first setting information, wherein the information processing apparatus is configured to use the setting information and the setting information is necessary to acquire user information from a device through a network, and wherein the user information includes at least either one of the following: (i) an upper limit number of storage areas that are allocated in the device and available to a user, or (ii) a level of authority to control data to which the user can refer on the device, acquiring, as second setting information, setting information which is necessary to acquire the user information from the device, acquiring, when there is inconsistency between the first setting information and the second setting information due to a content mismatch, the user information from the device through the network by using either one of the first setting information or the second setting information in both the information processing apparatus and the device, and importing the user information acquired from the device.

Further features of the present disclosure will become apparent from the following description of exemplary embodiments with reference to the attached drawings.

BRIEF DESCRIPTION OF THE DRAWINGS

FIGS. 5A and 5B each illustrate an example of a screen including device information provided by the management apparatus.

FIGS. 6A to 6C each illustrate an example of a screen including user information provided by the management apparatus.

FIGS. 7A to 7D each illustrate an example of a screen provided by the management apparatus according to a first exemplary embodiment.

FIG. 15 illustrates an example of a screen provided by the management apparatus according to the fourth exemplary embodiment.

DESCRIPTION OF THE EMBODIMENTS

<Description About System Configuration>

Figure 1:
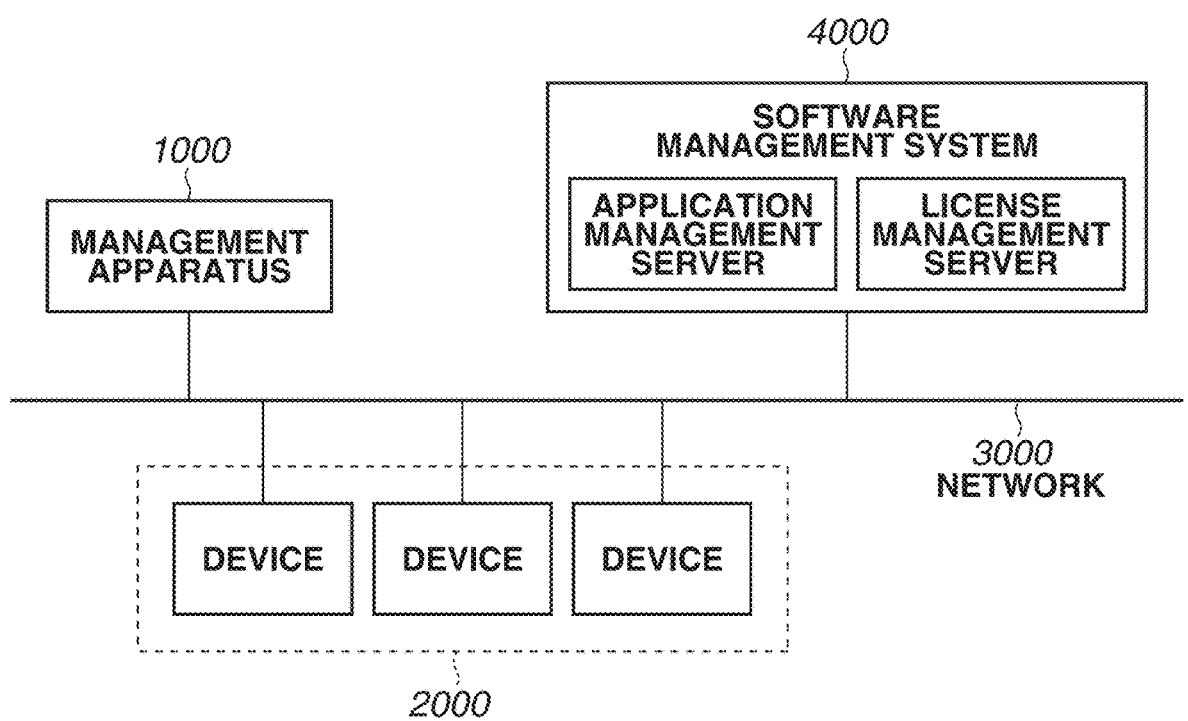
FIG. 1 is a schematic diagram illustrating a configuration of a device management system.

FIG. 1 is a schematic diagram illustrating a configuration of a device management system according to exemplary embodiments of the present disclosure.

In the system illustrated in FIG. 1, a plurality of devices 2000 and a management apparatus 1000 are installed on a network 3000. The devices include an image foxing apparatus such a printer and a multi-function apparatus. Device management software that manages the devices operates on the management apparatus 1000.

The devices 2000 include a printer that receives print data through the network 3000 and performs printing on tangible paper using a printing technique such as electrophotography and an ink-jet technology. The devices 2000 include a scanner that scans a paper original document and produces electronic data. The devices 2000 include a multi-function apparatus that integrates a scan function, a printer function, a transmission function to transmit electronic data by e-mail. Further, each device 2000 manages various settings to be used in the device itself and user information about a user who uses the device.

A software management system 4000 is a system that manages software for installing an application on the devices 2000, and includes an application management server and a license management server. However, the system can be omitted. The software management system 4000 and each device 2000 are connected with each other through the network 3000.

The network 3000 is realized by using a technique of wired connection or wireless connection, and a local area network (LAN) and the Internet are, for example, assumable.

Figure 2:
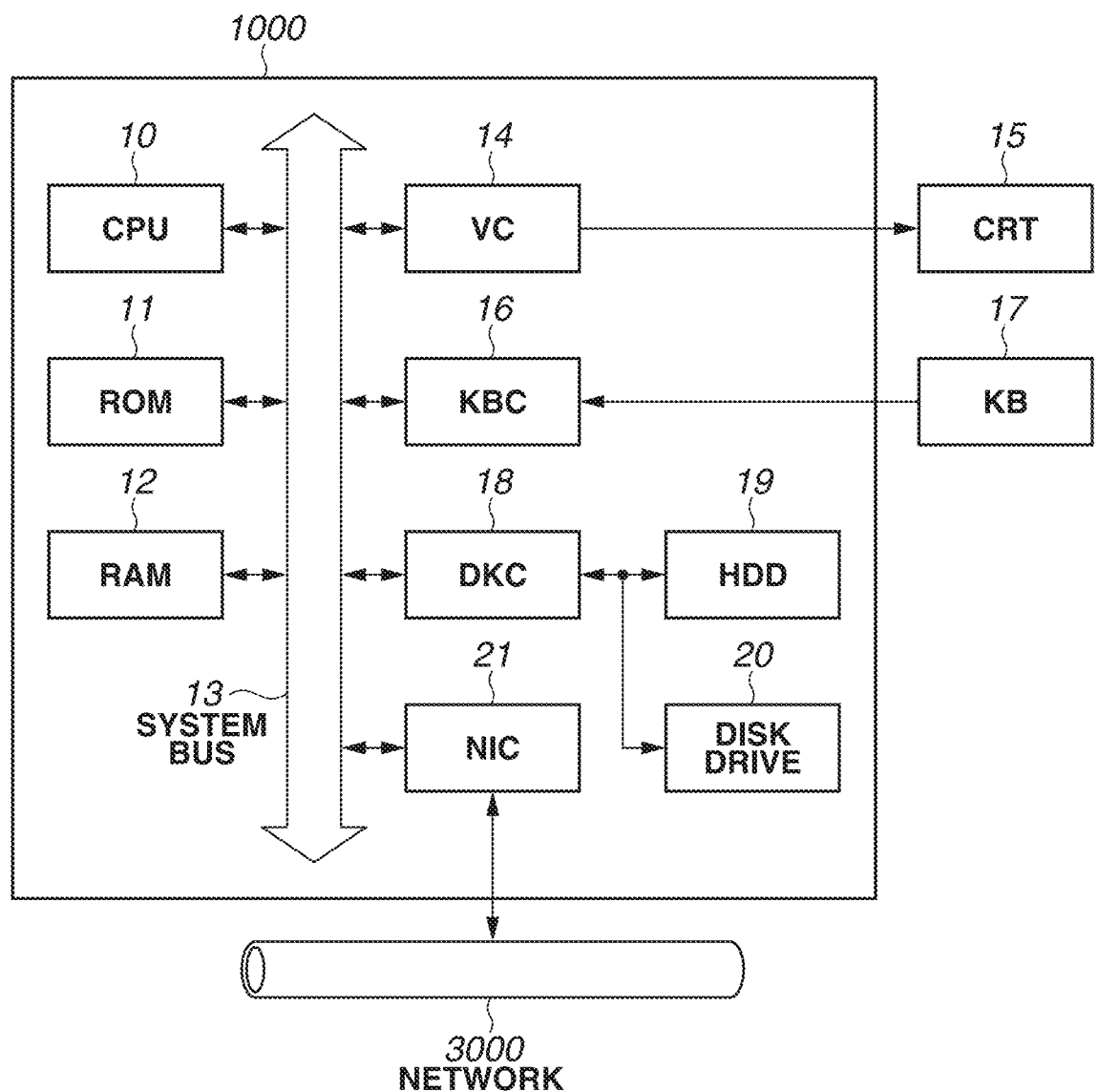
FIG. 2 is a diagram illustrating a hardware configuration example of an information processing apparatus constituting a management apparatus and a device.

FIG. 2 is a diagram illustrating a hardware configuration example of an information processing apparatus constituting the management apparatus 1000 and the devices 2000.

A central processing unit (CPU) 10 executes an operating system (OS) and various programs that are stored in a read-only memory (ROM) 11 and a hard disk drive (HDD) 19 using a random-access memory (RAM) 12 as a work area. The HDD 19 is an example of a storage device for storing a program and various settings. Constituent elements of the device are connected to one another through a system bus 13. The device includes a disk controller (DKC) 18, a Disk Drive 20, a video card (VC) 14, and a display apparatus (CRT) 15. A storage medium such as a compact disk read-only memory (CD-ROM), a digital versatile disk (DVD), a magnetic tape, and an integrated circuit (IC) memory card can be mounted on the Disk Drive 20. The device further includes a keyboard controller (KBC) 16, a keyboard (KB) 17, and a pointing device (not illustrated) such as a mouse. The device performs data communication with another device on the network through a network interface board (NIC) 21.

In a case of the management apparatus 1000, it realizes processing described below by the CPU 10 executing the device management software stored in the storage device such as the HDD 19.

In a case of the device 2000, it further includes hardware, which is not illustrated, such as a scanner engine and a print engine for achieving the above-mentioned scan function and printer function. Further, software including software for achieving these functions, and for communicating with the management apparatus 1000 and responding to a request is stored in the storage device and executed by the CPU 10.

Figure 3:
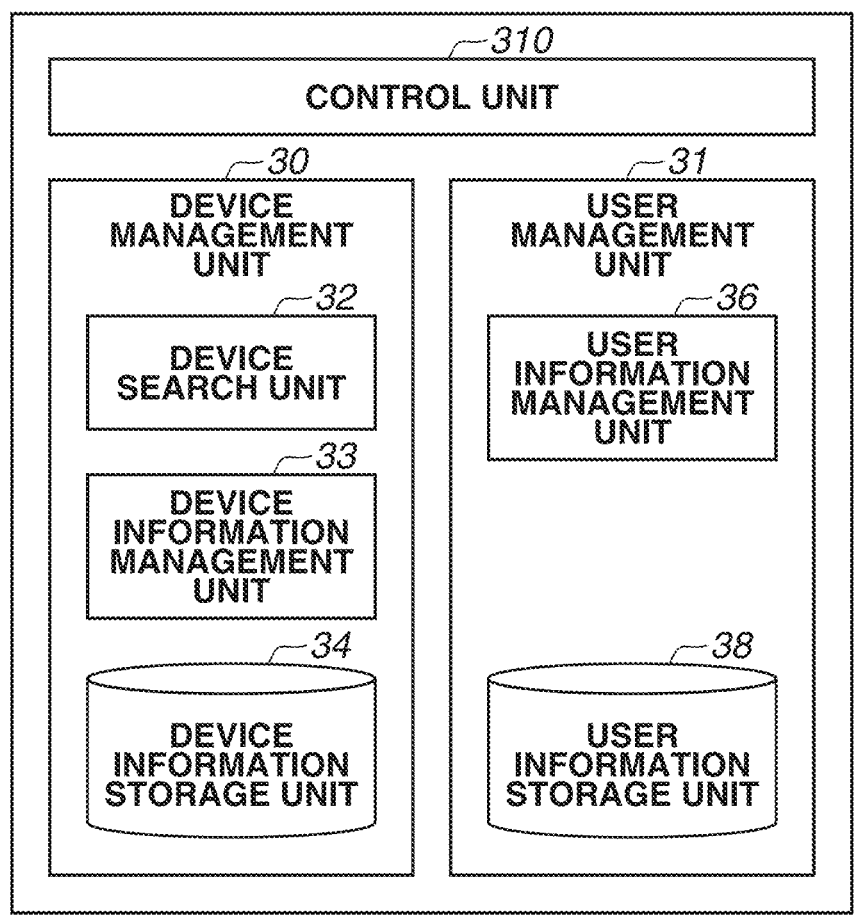
FIG. 3 is a block diagram illustrating a module configuration example of software of the management apparatus.

FIG. 3 illustrates a module configuration example of software of a device management unit 30, a user management unit 31, and a control unit 310, which operate on the management apparatus 1000. The module configuration in the example is a main section of processing to be realized by executing the device management software as described below.

The device management unit 30 includes a device search unit 32, a device information management unit 33, and a device information storage unit 34. The user management unit 31 includes a user information management unit 36 and a user information storage unit 38. The control unit 310 controls functions provided by the device management unit 30 and the user management unit 31, in response to an instruction given from an administrator through various screens. The various screens for these functions can be implemented as a web-based application. In this case, the control unit 310 provides these screens on a web browser.

The device search unit 32 searches the device 2000 on the network 3000 to acquire device information (network address and identification information of device). The device search unit 32 uses a device search function to search for the device 2000 through, for example, the Simple Network Management Protocol (SNMP), the Internet Protocol (IP), broadcasting, and the Service Location Protocol (SLP)/multicasting. Specifically, as a result of the search, the device search unit 32 can acquire data such as a management information base (NUB). The device information management unit 33 uses the acquired device information to manage the device 2000 found by the search. The device information is stored in the device information storage unit 34 as a database that is realized in part of the storage device. The device information includes, other than the above information, setting information for controlling functions of the device 2000, and data groups indicating a device type, a function, and an option configuration. The device information includes, in addition to settings for a protocol and an application programming interface (API) to be used for the communication with the device 2000, authentication information for making access to the device 2000. The device information management unit 33 can issue various requests for acquiring the information from the device 2000 and distributing the information through the network.

The user information management unit 36 stores the user information to be used for the device 2000 which is managed by the device management unit 30, in the user information storage unit 38 serving as a database that is realized by part of the storage device, and manages the user information. The user information management unit 36 can manage, through a screen provided by the control unit 310, information input by the administrator and imported information as the user information. Further, the user information management unit 36 can issue, through the network 3000, various requests for acquiring the user information from the device 2000 and distributing the user information.

The user information includes a plurality of items and data combining values of the items. The items include a user name, a password, belonging information of the user, an e-mail address, an upper limit number of storage areas to be allocated in the device 2000 that is available to the user, and a level of authority of the user for controlling data that can be used (referred) by the user on the device 2000. The upper limit number of the storage areas to be allocated in the device 2000 that is available to the user is hereinafter referred to as a user upper limit number. The level of authority of the user is referred to as a level.

The storage areas to be allocated in the device 2000 can store desired data such as image data that is acquired by scanning to be executed in response to an instruction by the user. The user can organize data of his/her own by using different storage areas.

Specifically, the level described above indicates each user's authority to refer to data (especially destination data) that has already been registered in the device 2000. Important destination data is used in such a manner that access to the data by part of users is restricted.

Figure 4:
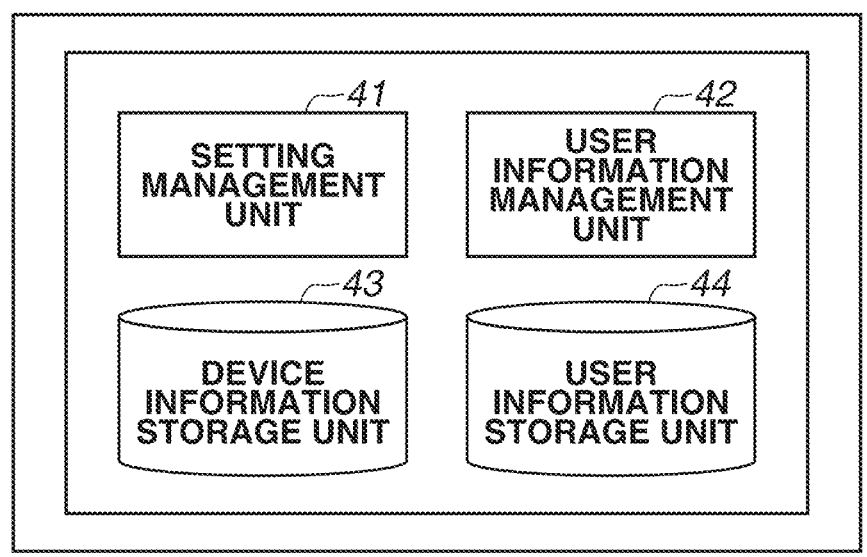
FIG. 4 is a block diagram illustrating a module configuration example of software of the device.

FIG. 4 illustrates a module configuration example of software that operates on the device 2000. The module configuration in the example is a main section of processing to be realized by executing software according to the present disclosure, as described below.

A setting management unit 41 uses a device information storage unit 43 serving as a database that is realized by part of the storage device to manage the device information, and respond to a request from the device management unit 30 of the management apparatus 1000.

A user information management unit 42 uses a user information storage unit 44 serving as a database that is realized by part of the storage device to manage the user information, and responds to a request from the user management unit 31 of the management apparatus 1000. The user information management unit 42 confirms, for example, a communication method, a setting, and authority of a requestor, and performs control as to whether each data included in the user information should. be responded.

Specifically, when a setting for a predetermined API, such as a device vendor's unique API that the management apparatus 1000 and the device 2000 can deal with, has not been adequately made, the device 2000 can perform control not to include part of the data such as the e-mail address, the user upper limit number, and the level in response to the request for the user information.

The setting regarding the acquisition of the user information through the network 3000 such as the API setting is managed by the setting management unit 41 and can be set through a setting screen provided by the device 2000. The setting can also be changed in response to a request given from the device management unit 30 of the management apparatus 1000.

FIG. 5A illustrates a device list indicating devices managed by the management apparatus 1000. The device list provides the device information such as a device name, a host name, an IP address, and a serial number of each device. The administrator can freely select the device on the device list and refer to setting information of the selected device.

FIG. 5B illustrates an example of a screen that refers to the setting information, which is part of the device information of the device selected from the device list. The setting information displayed on the screen is provided based on information stored in the device information storage unit 34. Items such as an SNMP setting, an authentication setting, an API setting, and an administrator authority setting, and setting contents indicating respective values for the items can be confirmed on the screen. The device information stored in the device information storage unit 34 can be updated. by the administrator editing the setting values through the screen.

As advanced settings of the SNMP setting, an SNMP port number, a community name for SNMPv1, a user name for SNMPv3, a context name, an authentication protocol, an authentication password, a setting for selecting v1 or v3, and a Read Only setting or a Read/Write setting can be made.

The API setting is a setting for an application programming interface that becomes public between the management apparatus 1000 and the device 2000, and is necessary/ requisite for handling the data that is part of the data of the user information, as described above. When a predetermined API is supported, the API can absorb a difference in types of devices, control the devices, and make access to a resource. The present disclosure uses the API to acquire the special user information such as the e-mail address, the user limit number, and the level. Further, the management apparatus 1000 also uses the API when acquiring, for example, an audit log that is used for tracking unauthorized access, and special counter data from the device. The predetermined API includes an API uniquely defined by a vendor of the device, and a RESTful API constructed especially in accordance with the concept of the REpresentational State Transfer (REST) using a web technology such as Hypertext Transfer Protocol (HTTP) communication. Each of the APIs needs unique authentication. When the APIs are used in the management apparatus 1000, authentication information such as identification data (ID) and a password corresponding to a target device needs to be made. Although an example using the unique API will be described below, the present disclosure can also be applied to the case of using the RESTful API described above.

FIGS. 6A to 6C each illustrate a screen example provided by the user information management unit 36 through the control unit 310.

FIG. 6A illustrates an example user list according to the user information managed by the management apparatus 1000. The user list is not limited to this example, and can be configured to refer to data included in the user information stored in the user information. storage unit 38, such as user identification information including the user name and the belonging information of the user, the password, the e-mail address, the user upper limit number, and the level. The administrator can manually register the user information in the user information storage unit 38 by pressing a user registration button on the screen. The user information can be registered also by pressing an import button on the screen.

FIG. 6B illustrates an import selection screen to be provided by pressing the import button. The screen causes the administrator to select any one of "IMPORT FROM FILE", "IMPORT FROM DEVICE", and "IMPORT FROM EXTERNAL SERVER" as a method of importing (acquiring) the user information. In either case where the administrator has selected "IMPORT FROM FILE" or "IMPORT FROM EXTERNAL SERVER", he/she inputs a file name and server information. In a case where the administrator has selected "IMPORT FROM DEVICE", a screen illustrated in FIG. 6C for selecting a device, from which the user information to be imported is acquired, is displayed.

When the administrator selects a target device and presses an execute button on the screen illustrated in FIG. 6C, the user information management unit 36 communicates with the device identified by the selected device information through the network and executes processing of acquiring the user information. The user information acquired by the processing is stored in the user information storage unit 38 and reflected in the user list illustrated in FIG. 6A.

Processing according to the exemplary embodiments executed mainly in the management apparatus 1000 will be described below using flowcharts illustrated in FIGS. 10 to 14. Each of steps S1001 to S1006, steps S1101 to S1109, steps S1201 to S1209, steps S1301 to S1319, steps S1401 to S1408, steps S1501 to S1507 indicates processing realized by the CPU 10 loading a program such as the device management software into the RAM 12 and executing the program.

A first exemplary embodiment will be described below. Processing executed in the management apparatus 1000 according to the present exemplary embodiment will be described in detail below with reference to FIGS. 7A to 7D, FIG. 10, and FIG. 11.

Figure 10:
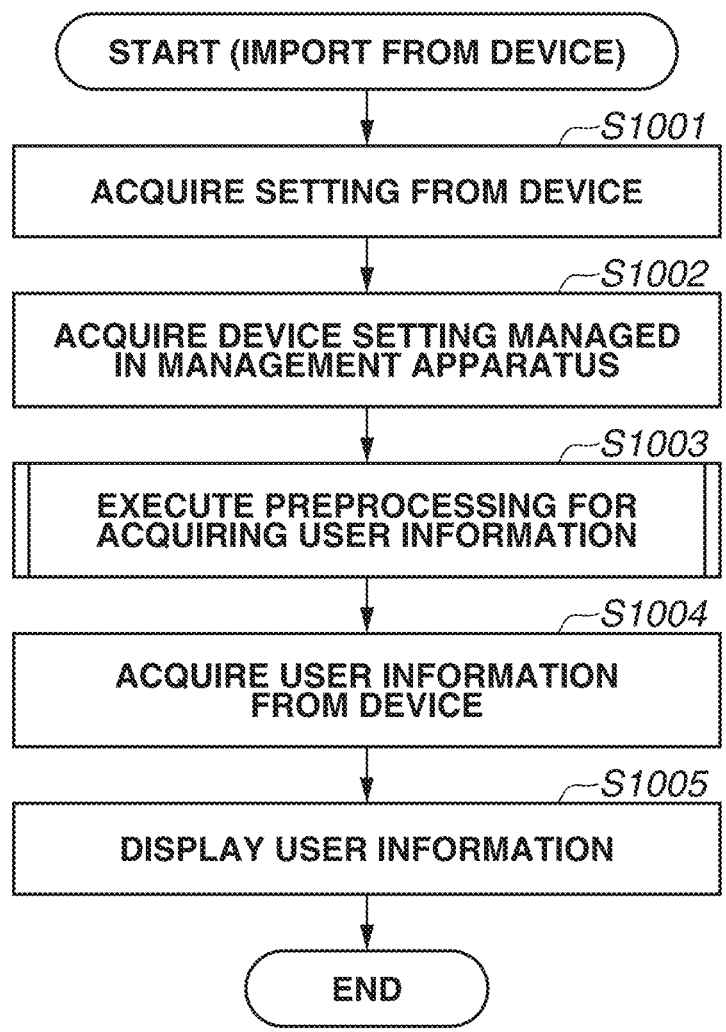
FIG. 10 is a flowchart illustrating processing of the management apparatus to import the user information acquired from the device.

FIG. 10 is a flowchart illustrating processing executed when the execute button is pressed on the screen illustrated in FIG. 6C.

In step S1001, the device information management unit 33 communicates with the device 2000 corresponding to the selection made on the screen illustrated in FIG. 6C through the NIC 21 and the network 3000, and requests data for acquiring the user information included in the device information. The requested data includes at least the unique API setting described above. The setting management unit 41 of the device 2000 responds to the device information management unit 33 with the device information including the requested data.

In step S1002, the device information management unit 33 acquires from the device information storage unit 34 data to acquire the user information out of the device information of the device 2000 corresponding to the selection made on the screen illustrated in FIG. 6C.

In step S1003, preprocessing for acquiring the user information using the data acquired in step S1001 and step S1002 is executed. The processing will described in detail below with reference to FIG. 11.

In step S1004, the user information management unit 36 communicates with the device 2000 corresponding to the selection made on the screen illustrated in FIG. 6C through the NIC 21 and the network 3000, and requests and acquires the user information. The acquired information is stored in the user information storage unit 38, and the import processing of the user information is completed. In step S1005, the user information management unit 36 displays the user information acquired in step S1005 through the control unit 310.

Figure 11:
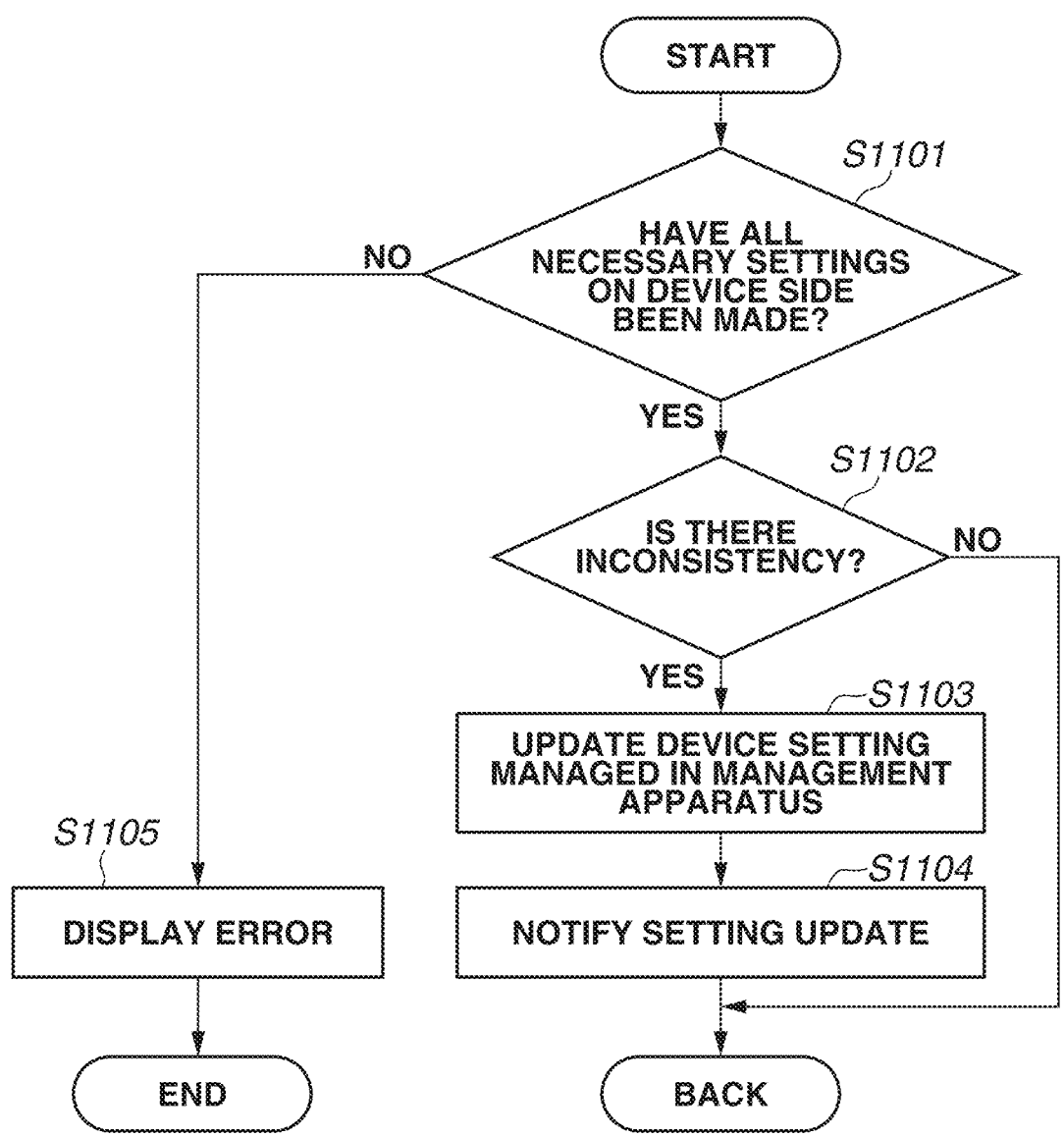
FIG. 11 is a flowchart illustrating details of preprocessing for acquiring the user information according to the first exemplary embodiment.

FIG. 11 is a flowchart illustrating details of the preprocessing for acquiring the user information indicated in step S1003.

In step S1101, the user information management unit 36 refers to the data acquired in step S1001 to determine whether all settings necessary for acquiring the user information from the device 2000 have been made. Specifically, when the settings are insufficient, for example, in a case where the unique API setting is invalid, or in a case where access to the user information from the external apparatus such as the management apparatus 1000 is restricted, the user information management unit 36 determines No in step S1101, and the processing proceeds to step D1105. On the other hand, in a case where all the necessary settings have been made (YES in step S1101), the processing proceeds to step S1102.

In step S1102, the user information management unit 36 compares contents of the data acquired in step S1001 and contents of the data acquired in step S1002 with each other, and determines whether there is inconsistency. Specifically, it is determined that there is inconsistency, for example, when authentication information of the data acquired in step S1001 and that of the data acquired in step S1002 do not match with each other, or when a value of one of the authentication information of the acquired data is missing. When there is inconsistency, the processing proceeds to step S1103. When there is no inconsistency, the processing ends and returns to the processing illustrated in FIG. 10.

In step S1103, the device information management unit 33 updates data in the device information storage unit 34 in the management apparatus 1000 with the data acquired from the device 2000 in step S1001. The above-mentioned unique API setting stored in the device information storage unit 34 is synchronized with the setting on the device 2000 side.

Assume that the device information that has been stored in the device information storage unit 34 before the synchronization is as illustrated in FIG. 7A. On this screen, settings such as the SNMP setting (port number: 161, etc.), the authentication setting (ID: 0001, password: 12345), and the administrator authority setting (password: 12345) have been acquired. On the other hand, authentication information for the unique API has not yet been set. The device information updated in step S1103 is as illustrated in FIG. 7B. On this screen, the authentication information such as ID: 1000 and the password: abcde is included as the unique API setting.

In step S1104, the device information management unit 33 displays a screen illustrated in FIG. 7C, through the control unit 310, indicating that the data in the management apparatus 1000 has been updated. Subsequently, the sequence of processing illustrated in FIG. 11 ends and returns to the processing illustrated in FIG. 10.

In step S1105, the user information management unit 36 displays an error screen (FIG. 7D), through the control unit 310, indicating that the user information cannot be acquired due to the setting on the device side, and the processing illustrated in FIG. 10 and FIG. 11 ends.

The processing illustrated in FIG. 11 allows the management apparatus 1000 to reliably acquire the user information from the device 2000 having the necessary settings, and import the acquired user information to the user information storage unit 38.

According to the present exemplary embodiment, all data included in the user information that can be held by all the devices 2000 cannot be necessarily acquired. The present exemplary embodiment acquires all the data that are necessary for setting on the management apparatus side and for acquiring the data from the target device when the settings that can be edited become consistent with each other. The data includes, for example, (unavailable) personal information, of which output to the outside has been restricted in advance on the device side.

When the management apparatus 1000 acquires the user information from the device 2000 and imports the acquired user information, the present exemplary embodiment can suppress a failure of acquisition of part of the user information flue to inconsistency between the settings.

Figure 8A:
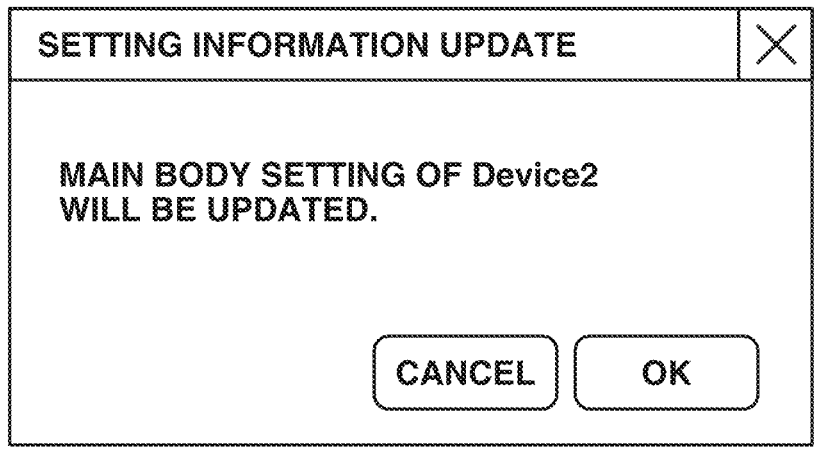
FIGS. 8A to 8C each illustrate an example of a screen provided by the management apparatus according to a second exemplary embodiment.
Figure 8B:
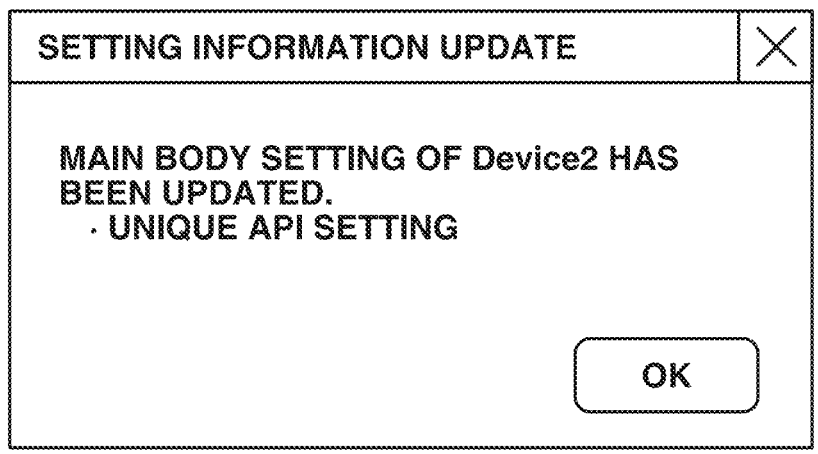
Figure 8C:
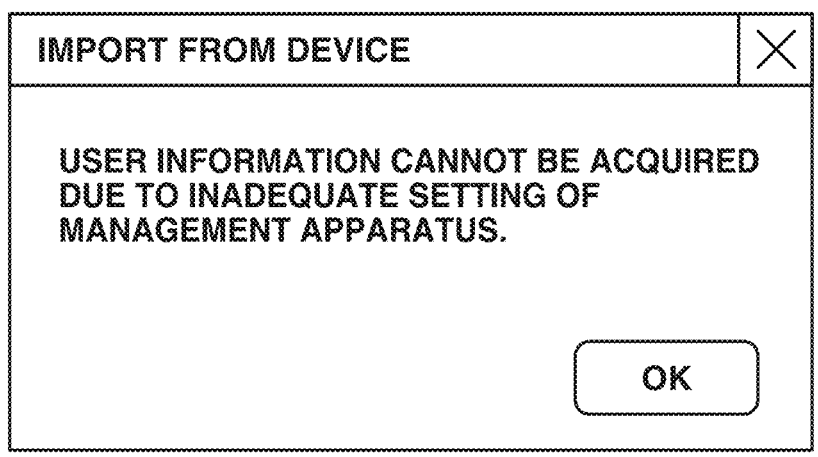

A second exemplary embodiment will be described below. When acquiring the user information from the device 2000 and importing the acquired user information, the management apparatus 1000 can overwrite the setting on the device 2000 using data managed in the device information storage unit 43. Processing executed in the management apparatus 1000 according to the present exemplary embodiment will be described in detail below with reference to FIGS. 8, 10, and 12.

The processing illustrated in FIG. 10 is the same as that in the first exemplary embodiment and thus the description thereof is omitted.

Figure 12:
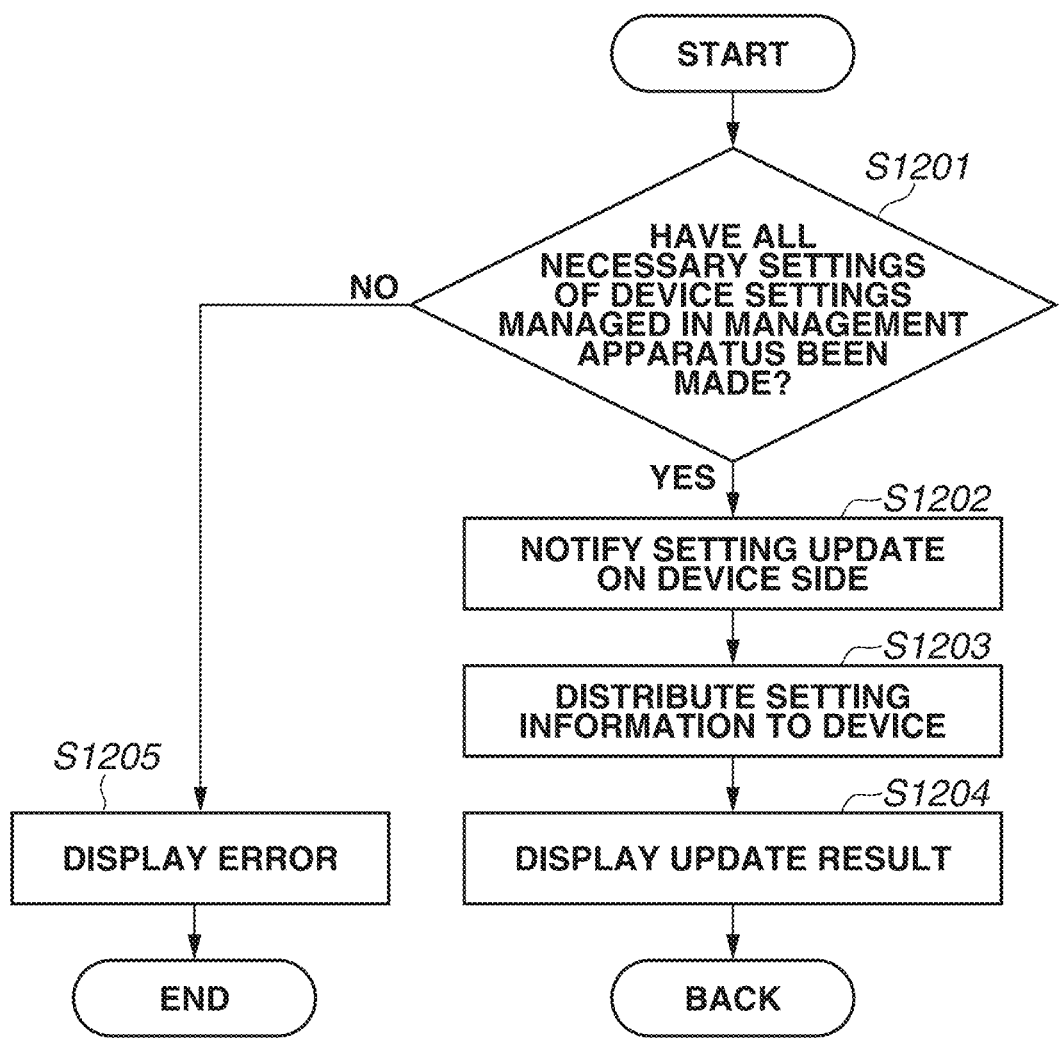
FIG. 12 is a flowchart illustrating details of preprocessing for acquiring the user information according to the second exemplary embodiment.

FIG. 12 is a flowchart illustrating details of preprocessing for acquiring the user information indicated in step S1003 of FIG. 10, according to the present exemplary embodiment.

In step S1201, the user information management unit 36 refers to the data acquired in step S1002 to determine whether all the settings necessary for acquiring the user information from the device 2000 have been made. Specifically, when the settings are insufficient, for example, in a case where the unique API setting is invalid, the user information management unit 36 determines No in step S1201, and the processing proceeds to step S1205. On the other hand, in a case where all the necessary settings have been made (YES in step S1201), the processing proceeds to step S1202.

In step S1202, the device information management unit 33 displays a screen (FIG. 8A), through the control unit 310, indicating that the setting of the device 2000 corresponding to the selection made on the screen in FIG. 6C will be updated with the data in the device information storage unit 34.

In step S1203, the device information management unit 33 distributes the device information including the settings necessary for acquiring the user information, to the device 2000 through the NIC 21 and the network 3000, and issues a request for update with the device information. In response to the request, the setting management unit 41 of the device 2000 updates the data in the device information storage unit 43. Specifically, the unique API setting is updated on the management apparatus side.

In step S1204, the device information management unit 33 displays a screen (FIG. 8B), through the control unit 310, indicating that the setting of the device 2000 corresponding to the selection made on the screen illustrated in FIG. 6C has been updated. The apparatus gets out of the sequence of processing illustrated in FIG. 12 and returns to the processing illustrated in FIG. 10.

In step S1205, the user information management unit 36 displays an error screen (FIG. 8C), through the control unit 310, indicating that the user information cannot be acquired due to the setting on the management apparatus side, and the processings illustrated in FIG. 10 and FIG. 12 end.

A third exemplary embodiment will be described below. According to the present exemplary embodiment, one of device information in the device information storage unit 43 and a setting on the device side can be updated with the other to complying with the intention of the user such as the administrator. Processing executed in the management apparatus 1000 according to the present exemplary embodiment will be described in detail below with reference to FIGS. 9, 10, and 13.

The processing illustrated in FIG. 10 is the same as the first exemplary embodiment and thus the description thereof is omitted.

Figure 13:
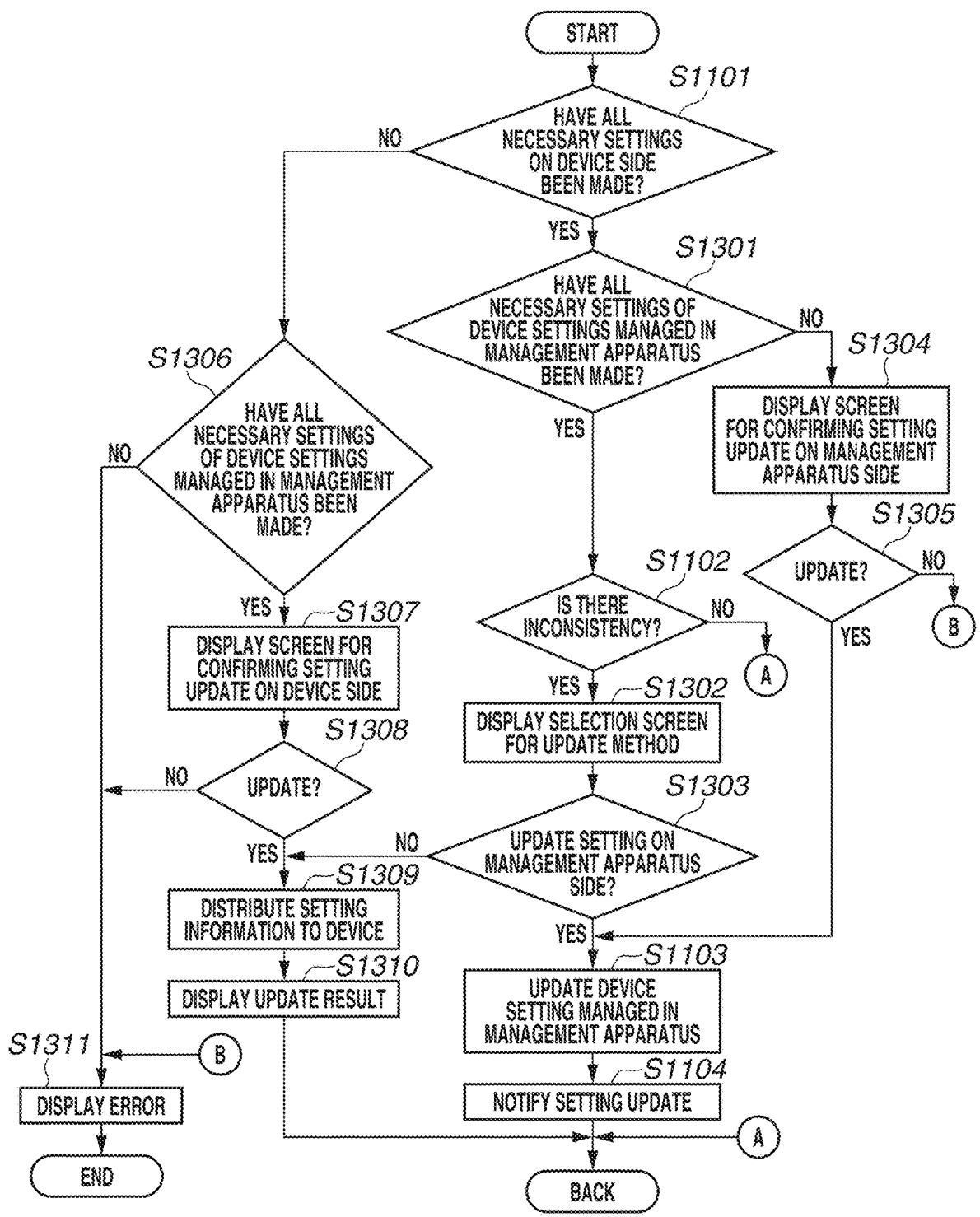
FIG. 13 is a flowchart illustrating details of preprocessing for acquiring the user information according to the third exemplary embodiment.

FIG. 13 is a flowchart illustrating details of preprocessing for acquiring the user information indicated in step S1003 of FIG. 10, according to the present exemplary embodiment. Especially, processing extended from that illustrated in FIG. 11 will be described below.

In step S1101, the user information management unit 36 refers to the data acquired in step S1001 to determine whether all the settings necessary for acquiring the user information from the device 2000 have been made, as described in the first exemplary embodiment, When the user information management unit 36 determines NO in step S1101, the processing proceeds to step S1306. On the other hand, in a case where all the necessary settings have been made (YES in step S1101), the processing proceeds to step S1301.

In step S1301, the user information management unit 36 makes a determination similar to that made in step S1201 illustrated in FIG. 12. When the user information management unit 36 determines NO in step S1301, the processing proceeds to step S1304. On the other hand, in a case where all the necessary settings have been made (YES in step S1301), the processing proceeds to step S1102.

In step S1102, the user information management unit 36 compares the contents of the data acquired in step S1001 and the contents of the data acquired in step S1002 with each other, and determines whether there is inconsistency, as described in the first exemplary embodiment. When there is inconsistency, the processing proceeds to step S1302. When there is no inconsistency, the processing ends and returns to the processing illustrated in FIG. 10.

Figure 9:
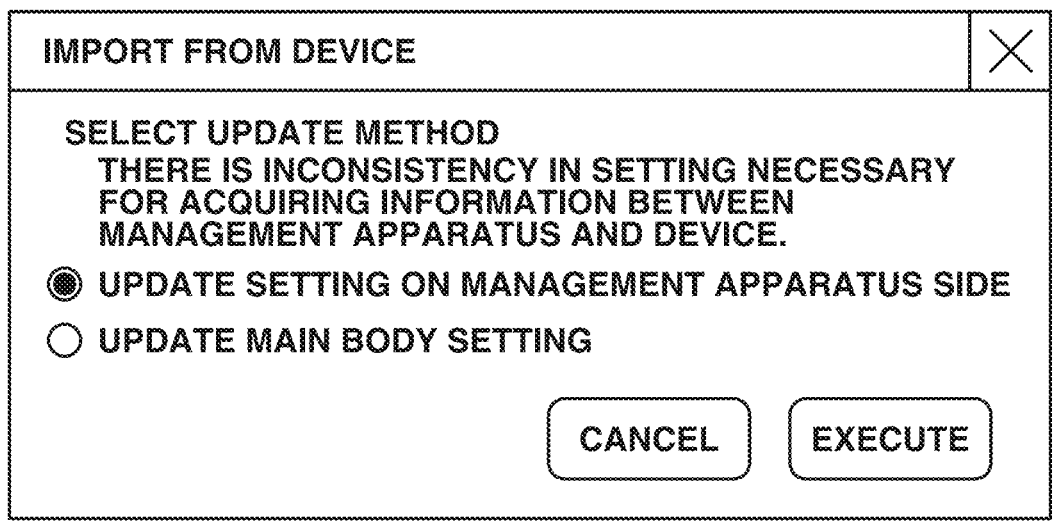
FIG. 9 illustrates an example of a screen provided by the management apparatus according to a third exemplary embodiment.

In step S1302, the user information management unit 36 displays a selection screen for an update method illustrated in FIG. 9 through the control unit 310. In a case where "UPDATE SETTING ON MANAGEMENT APPARATUS SIDE" has been selected, the data in the device information storage unit 34 in the management apparatus 1000 is updated with the data acquired from the device 2000 in step S1001. In a case where "UPDATE MAIN BODY SETTING" has been selected, the device information management unit 33 distributes the device information including the settings necessary for acquiring the user information, to the device 2000 through the NIC 21 and the network 3000, and issues a request for updating with the device information.

In step S1303, the user information management unit 36 determines whether the "UPDATE MAIN BODY SETTING" has been selected through the selection screen illustrated in FIG. 9, In a case where "UPDATE SETTING ON MANAGEMENT APPARATUS SIDE" has been selected, the processing proceeds to step S1103, The processings in step S1103 and step S1104 are the same as described in the first exemplary embodiment. When the processing is completed, the apparatus gets out of the sequence of processing illustrated in FIG. 13 and returns to the processing illustrated in FIG. 10. On the other hand, in a case where "UPDATE MAIN BODY SETTING" has been selected, the processing proceeds to step S1309.

In step S1304, the device information management unit 33 displays a confirmation screen (not illustrated), through the control unit 310, indicating that the setting on the management apparatus side is updated with the data acquired from the device 2000 in step S1001. The user can also select a cancel instruction on the confirmation screen.

In step S1305, the device information management unit 33 determines whether the update has been accepted through the confirmation screen. In a case where the cancel instruction has been selected, the processing proceeds to step S1311. In a case where the acceptance of the update has been confirmed, the processing proceeds to step S1103.

In step S1306, the user information management unit 36 makes a determination similar to that made in step S1201 illustrated in FIG. 12. When the user information management unit 36 determines NO in step S1306, the processing proceeds to step S1311. On the other hand, in a case where all the necessary settings have been made (YES in step S1306), the processing proceeds to step S1307.

In step S1307, the device information management unit 33 displays a confirmation screen (not illustrated), through the control unit 310, indicating that the main body setting of the device 2000 corresponding to the selection made on the screen in FIG. 6C will be updated with the setting managed on the management apparatus side. The user can also select a cancel instruction on the confirmation screen.

In step S1308, the device information management unit 33 determines whether the update has been accepted through the confirmation screen. In a case where the cancel instruction has been selected, the processing proceeds to step S1311. In a case where the acceptance of the update has been confirmed, the processing proceeds to step S1309.

In step S1309 and step S1310, the device information management unit 33 executes the processing similar to that executed in step S1203 and step S1204 illustrated in FIG. 12. Subsequently, the apparatus gets out of the sequence of processing illustrated in FIG. 13 and returns to the processing illustrated in FIG. 10.

In step S1311, the user information management unit 36 displays an error screen, through the control unit 310, indicating that the import from the device has been canceled. Subsequently, the processings illustrated in FIGS. 10 and 11 end.

A fourth exemplary embodiment will be described below. When the device to be used for importing the user information is selected, it is conceivable that only devices that have no inconsistency in the settings necessary for the acquisition are displayed as devices from which data can be imported. Processing executed in the management apparatus 1000 according to the present exemplary embodiment will be described in detail below with reference to FIGS. 14 and 15.

Figure 14:
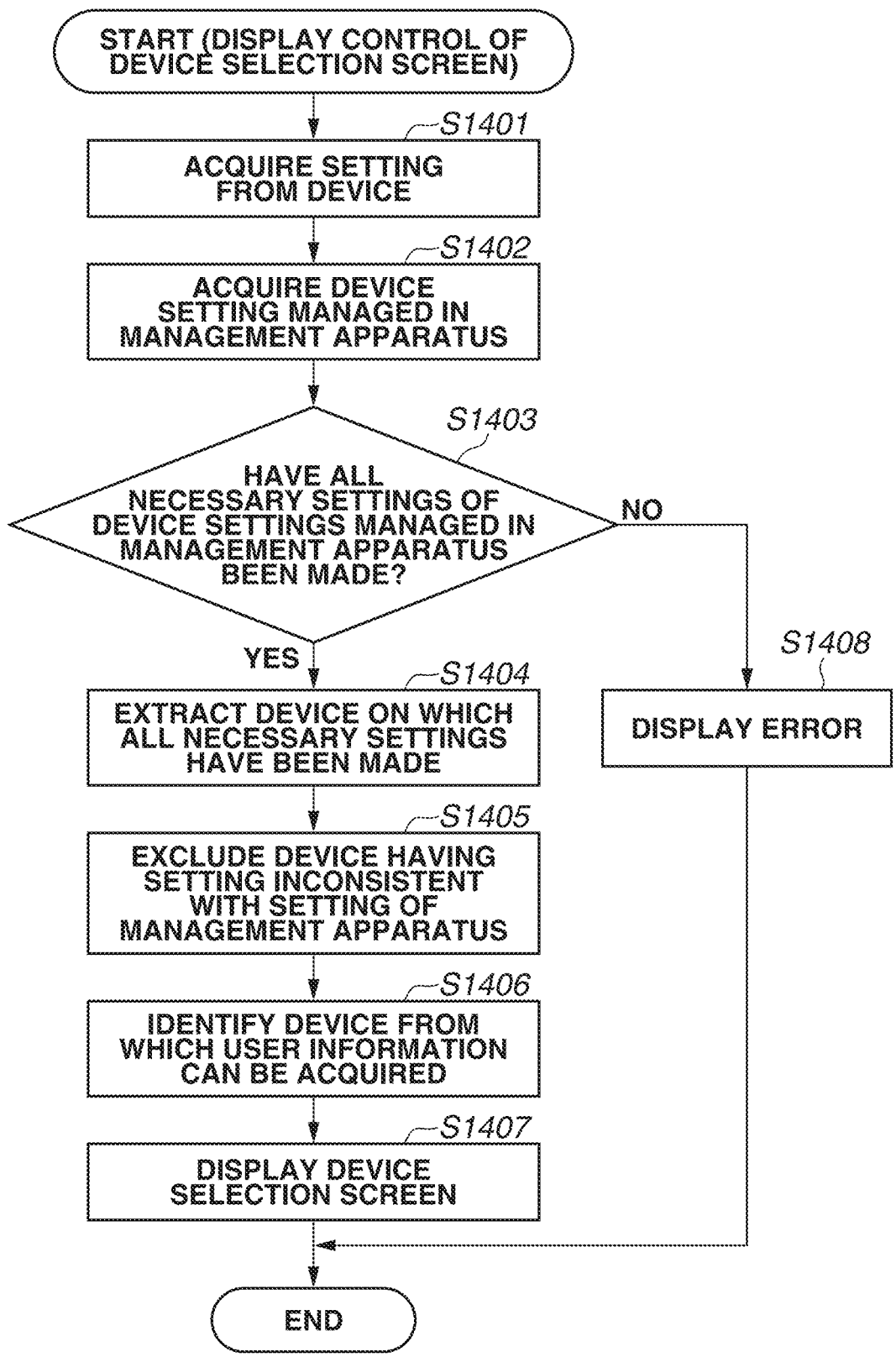
FIG. 14 is a flowchart illustrating processing for display control of a device selection screen according to the fourth exemplary embodiment.

FIG. 14 is a flowchart illustrating the processing executed when "IMPORT FROM DEVICE" is selected on the screen illustrated in FIG. 6B. According to the processing, a device selection screen illustrated in FIG. 15 is displayed instead of the screen illustrated in FIG. 6C. Details will be described below.

In step S1401 and step S1402, the device information management unit 33 executes processing similar to that executed in step S1001 and step S1002 illustrated in FIG. 10. In step S1401, the device information management unit 33 acquires setting information from all the devices 2000 managed by the management apparatus 1000.

In step S1403, the user information management unit 36 makes a determination similar to that made in step S1201 illustrated in FIG. 12. When the user information management unit 36 determines NO in step S1403, the processing proceeds to step S1408. On the other hand, in a case where all the necessary settings have been made (YES in step S1403), the processing proceeds to step S1404.

In step S1404, the user information management unit 36 refers to the data acquired in step S1401 to determine whether all the settings necessary for acquiring the user information have been made on each device 2000. As a result of the determination, the user information management unit 36 extracts and manages devices 2000 on which all the necessary settings have been made.

In step S1405, the user information management unit 36 compares the main body settings of each device 2000 extracted in step S1404 and the setting acquired in step S1402, and excludes a device 2000 having inconsistency between the settings. The user information management unit 36 makes the determination as to whether there is inconsistency as described in step S1102 illustrated in FIG. 11. The processing excludes the device 2000 that cannot acquire part of the user information such as the mail address, the user upper limit number, and the level from candidates for the device 2000 to be used for import of the user information.

In step S1406, the user information management unit 36 identifies the remaining devices 2000 after the exclusion in step S1405 as devices 2000 from which the user information can be acquired.

In step S1407, the user information management unit 36 displays a device selection screen illustrated in FIG. 15 through the control unit 310.

FIG. 15 illustrates a display example of the device selection screen according to the present exemplary embodiment. The device selection screen is displayed differently from the above-mentioned device selection screen illustrated in FIG. 6C in that a device 2000 that fails to acquire at least part of the user information cannot be selected. In this case, only a "Device 2" identified in step S1406 can be selected.

In step S1408, the user information management unit 36 displays an error screen, through the control unit 310, indicating that the import from the device 2000 has failed due to an inadequate setting on the management apparatus side. In this case, the device selection screen as illustrated in FIG. 15 is not displayed.

The present disclosure includes an apparatus or a system configured by combining the above-mentioned embodiments as appropriate, and a method thereof.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No, 2019-093738, filed May 17, 2019, which is hereby incorporated by reference herein in its entirety.

What is claimed is:

1. An information processing apparatus comprising:
   at least one processor and at least one memory storing instructions that, when the instructions are executed by the at least one processor, cause the at least one processor to perform operations including:
   managing setting information as first setting information, wherein the information processing apparatus is configured to use the setting information and the setting information is necessary to acquire user information from a device through a network, and wherein the user information includes at least either one of the following: (i) an upper limit number of storage areas that are allocated in the device and available to a user, or (ii) a level of authority to control data to which the user can refer on the device,
   acquiring, as second setting information, setting information which is necessary to acquire the user information from the device, acquiring, when there is inconsistency between the first setting information and the second setting information due to a content mismatch, the user information from the device through the network by using either one of the first setting information or the second setting information in both the information processing apparatus and the device, and importing the user information acquired from the device.

2. The information processing apparatus according to claim 1, wherein the user information further includes user identification information, a password, and an e-mail address.

3. The information processing apparatus according to claim 1, wherein part of the user information is acquired using a predetermined application programming interface (API), and other data of the user information is acquired without using the predetermined API, and wherein the setting information necessary to acquire the user information includes a setting for the predetermined API.

4. The information processing apparatus according to claim 3, wherein the part of the user information acquired using the predetermined API is at least either one of the following: (i) the upper limit number of the storage areas that are available to the user, or (ii) the level of authority to control the data to which the user can refer on the device.

5. The information processing apparatus according to claim 3, wherein the predetermined API is a RESTful API using a web technology.

6. The information processing apparatus according to claim 3, wherein the predetermined API is an API that is uniquely defined by a vendor of the device.

7. The information processing apparatus according to claim 1, wherein, when there is inconsistency between the first setting information and the second setting information due to the content mismatch, executing the instructions further cause the information processing apparatus to acquire the user information from the device through the network with the information processing apparatus using the second setting information.

8. The information processing apparatus according to claim 1, wherein, when there is inconsistency between the first setting information and the second setting information due to a content mismatch, executing the instructions further cause the information processing apparatus to acquire the user information from the device through the network by updating a setting of the device with the first setting information.

9. A method of an information processing apparatus, the method comprising:

managing setting information as first setting information, wherein the information processing apparatus is configured to use the setting information and the setting information is necessary to acquire user information from a device through a network, and wherein the user information includes at least either one of the following: (i) an upper limit number of storage areas that are allocated in the device and available to a user, or (ii) a level of authority to control data to which the user can refer on the device;

acquiring, as second setting information, setting information which is necessary to acquire the user information from the device;

acquiring, when there is inconsistency between the first setting information the second setting information due to a content mismatch, the user information from the device through the network by using either one of the first setting information or the second setting information in both the information processing apparatus and the device; and importing the user information acquired from the device.

10. A non-transitory computer-readable storage medium storing a program cause a computer to perform a method of an information processing apparatus, the method comprising:

managing setting information as first setting information, wherein the information processing apparatus is configured to use the setting information and the setting information is necessary to acquire user information from a device through a network, and wherein the user information includes at least either one of the following: (i) an upper limit number of storage areas that are allocated in the device and available to a user, or (ii) a level of authority to control data to which the user can refer on the device;

acquiring, as second setting information, setting information which is necessary to acquire the user information from the device;

acquiring, when there is inconsistency between the first setting information and the second setting information due to a content mismatch, the user information from the device through the network by using either one of the first setting information or the second setting information in both the information processing apparatus and the device;

importing the user information acquired from the device.

* * * * *